A. B. LANDIS.
CUTTER HEAD.
APPLICATION FILED APR. 11, 1910.
1,017,890.
Patented Feb. 20, 1912.
5 SHEETS—SHEET 1.
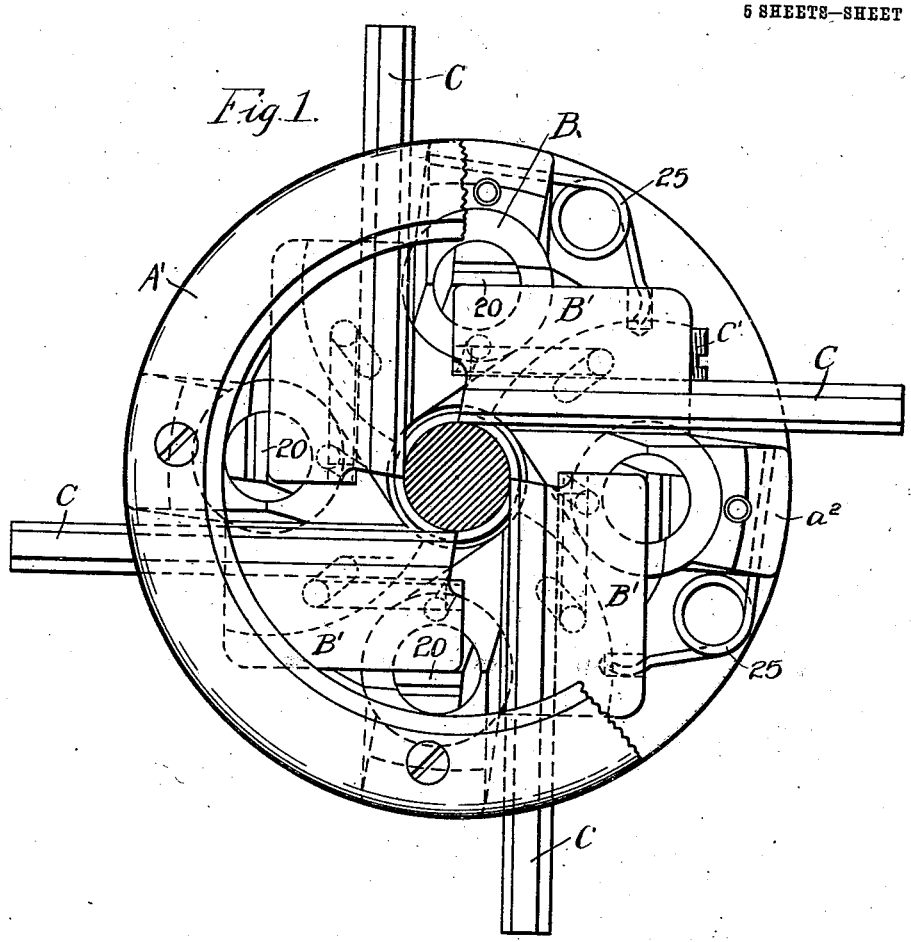
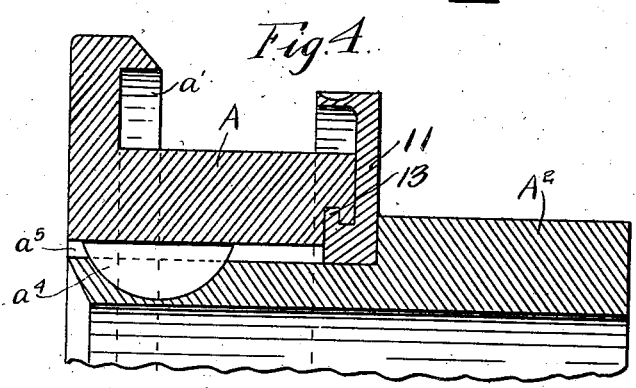
Witnesses
L. A. Price.
C. K. Reichenbach.
Inventor
Abraham B. Landis,
By E. W. Bradford
Attorney A. B. LANDIS.
CUTTER HEAD.
APPLICATION FILED APR. 11, 1910.
1,017,890.
Patented Feb. 20, 1912.
5 SHEETS—SHEET 2.
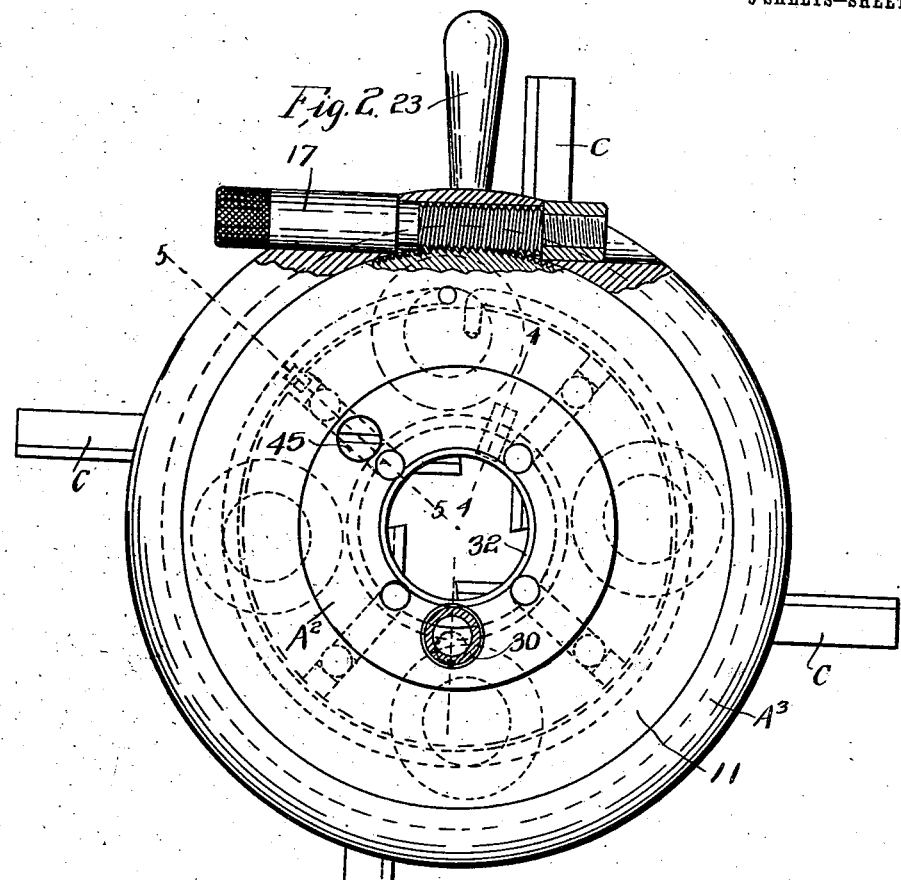
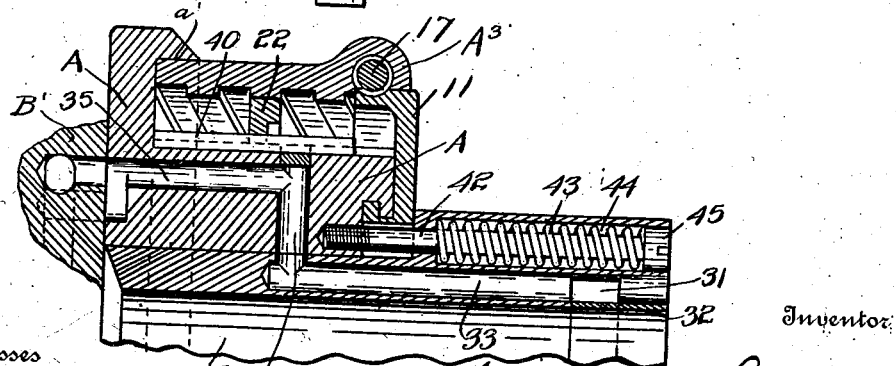

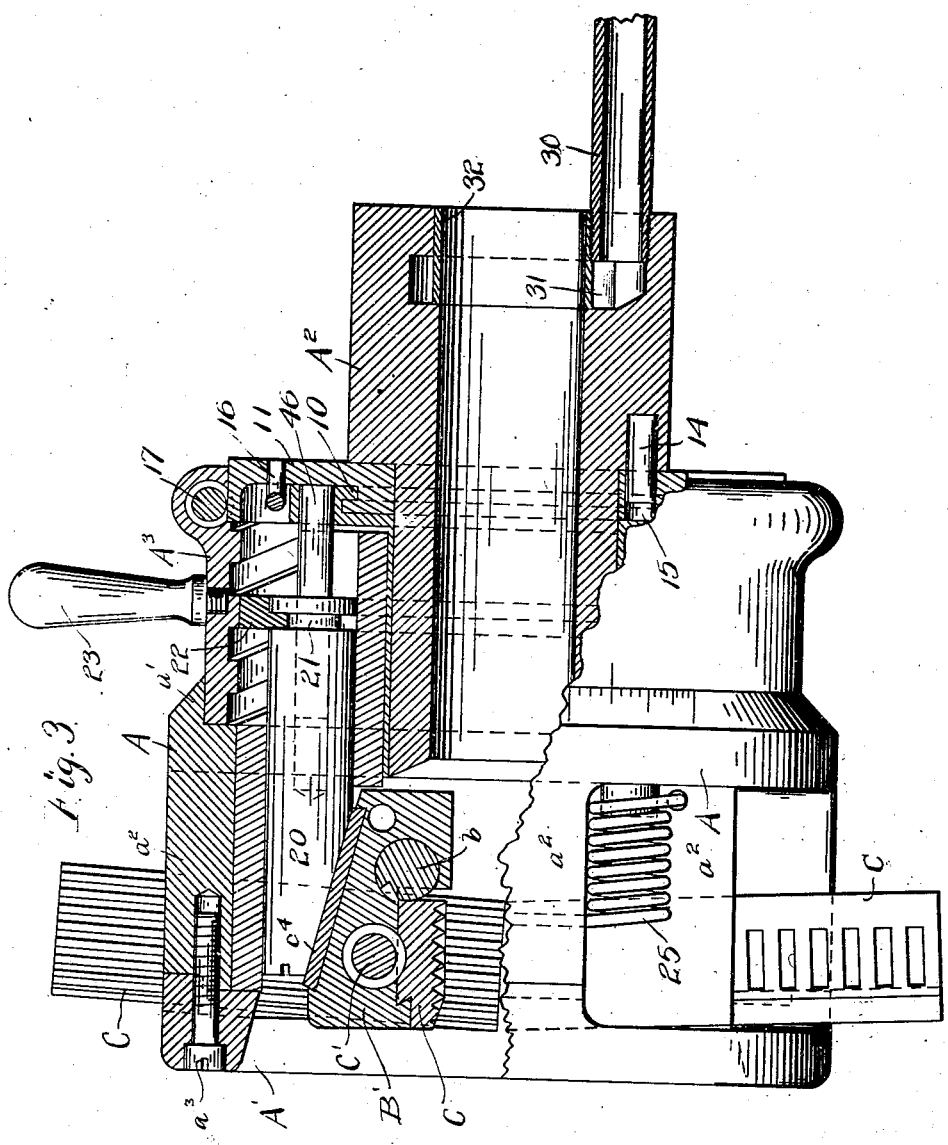

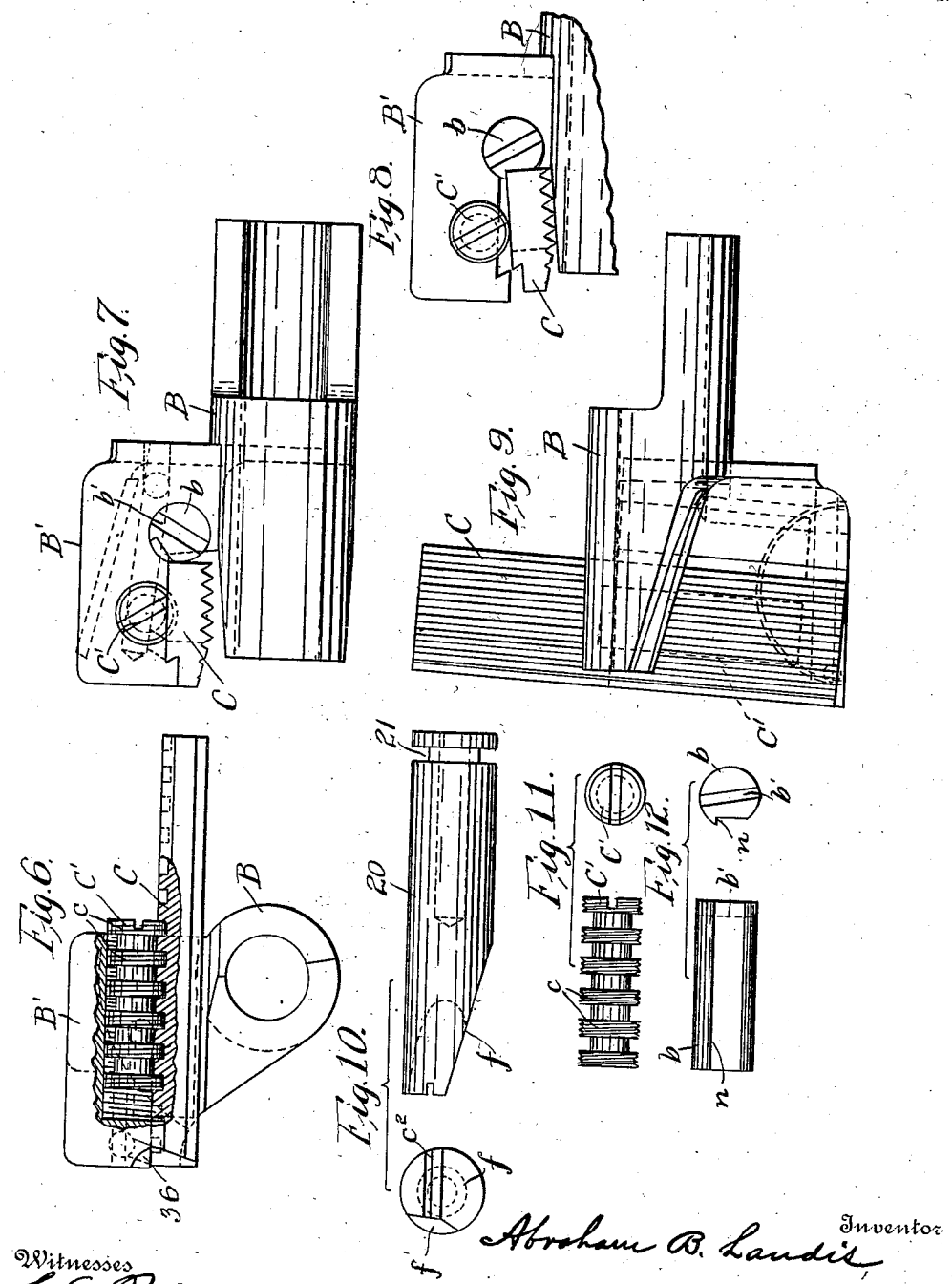

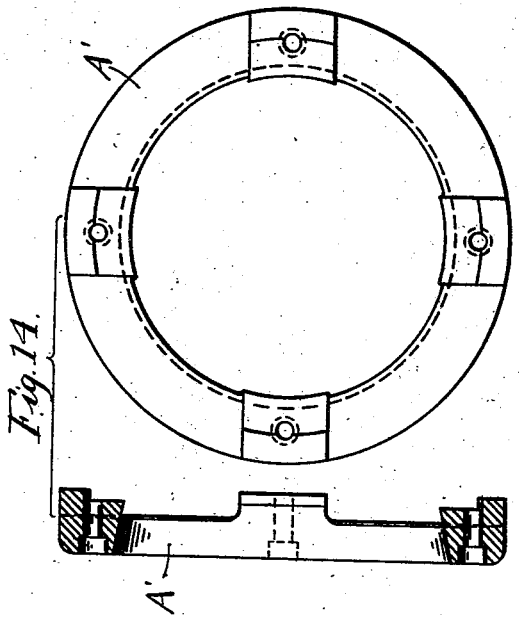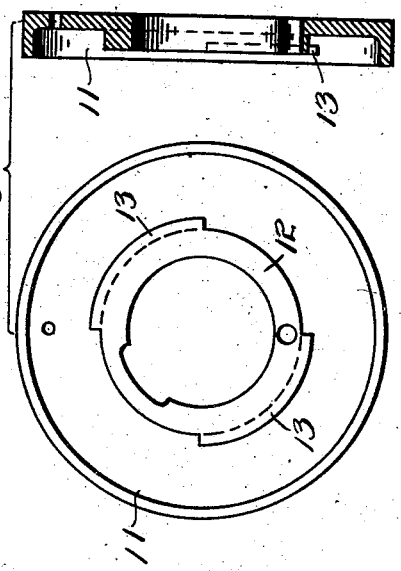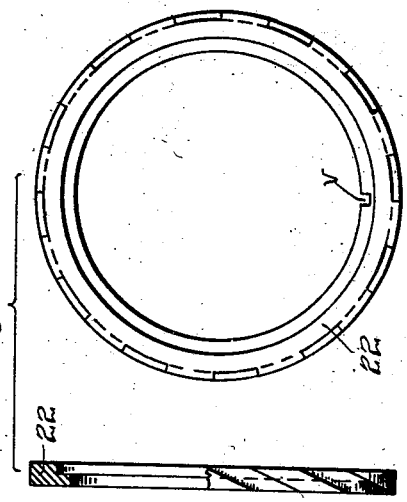

UNITED STATES PATENT OFFICE.

ABRAHAM B. LANDIS, OF WAYNESBORO, PENNSYLVANIA.

CUTTER-HEAD.

1,017,890.  Specification of Letters Patent.  Patented Feb. 20, 1912.

Application filed April 11, 1910. Serial No. 554,775.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in various improvements in the details of construction and arrangement of parts of cutter-heads designed for use on screw-cutting machines, whereby a head is provided for such purpose that is compact in size and of rigid structure and one that may be quickly and conveniently adjusted for work of different sizes and readily opened and closed, all as will be hereinafter more fully described and claimed.

Referring to the accompanying drawings which are made a part hereof and on which similar reference characters indicate similar parts, Figure 1 is a front elevation of a cutter-head of my improved construction, Fig. 2 a rear elevation of the same, Fig. 3 a view principally in central longitudinal section through said cutter-head showing one side in elevation, Fig. 4 a detail view on the dotted line 4—4 in Fig. 2, Fig. 5 a detail view on the dotted line 5—5 in Fig. 2, Fig. 6 an end elevation of one of the cutter-holders separately with one side of the casing broken away, Fig. 7 a side elevation of said cutter-holder, Fig. 8 a view similar to a portion of Fig. 7 showing the manner of removing the cutter, Fig. 9 an underside plan view of the cutter-holder and cutter, and Figs. 10, 11, 12, 13, 14 and 15 detail views illustrating several of the parts separately.

In said drawings the portions marked A represent the body, or frame, of the cutter-head, B the cutter-holders mounted therein and C the cutters.

The general construction shown is substantially like that shown in my application No. 547,250, filed March 4, 1910, the present application being merely to cover modifications and improvements in the structure there shown.

The body, or frame, A is of the form best illustrated in Figs. 3, 4 and 5. It comprises a casting of suitable size and dimensions for the purpose having a central aperture and a series of apertures arranged equidistant around said central aperture forming the bearings for the trunnions of the cutter-holders. On its outer edge it is formed with a rearwardly projecting overhanging flange $a'$ and with forwardly extending, or overhanging projections or arms $a^2$. Said arms $a^2$ are arranged with their centers on radial lines passing through the axes of the several trunnion bearings. A rigid ring $A'$ is shouldered (see Figs. 3 and 14) onto the outer ends of said arms $a^2$ being secured by screws $a^3$. The inner edge of said ring overlaps the inner face of said arms and forms a shoulder against which the forward ends of the trunnions of the cutter-holders abut. Said body A is mounted on a sleeve $A^2$ by means of a key $a^4$ set into a seat in said sleeve with its outer edge engaging in a longitudinal groove $a^5$ in one side of the central perforation in said body, thus permitting said body to slide longitudinally on said sleeve, but securing it against circumferential movement thereon. The rear end of said body is formed with a recess around its central perforation having an overhanging flange 10 which extends for a part of the distance around each side thereof. A head-plate 11, formed as best shown in Fig. 15, is mounted with its hub portion 12 within said recess, said hub having outwardly projecting segmental flanges 13 which are adapted, when said head is turned, to pass behind the overhanging flanges 10 of the body and lock said head thereon to allow a rocking movement between them. The head plate 11 is mounted on the sleeve $A^2$ its rear face abutting against a shoulder in said sleeve. A latch-pin 14 projects from said shoulder on one side of said sleeve $A^2$ and is adapted to engage with a perforation 15 in said head 11 to lock said head against circumferential movement in relation to said sleeve. A spring 16 is engaged at one end in a horizontal perforation in said head 11 and encircles the adjacent end of the body A and has its opposite end inserted in a radial perforation in said body. (See Fig. 3 and dotted line in Fig. 2.) The tension of said spring is exerted against the latch-pin 14 so that when the body is slid forward on sleeve $A^2$ to disengage said latch-pin the spring will expand and turn the head 11 on its bearing. A bolt 42 (see Fig. 5) engages at its inner end in a screw-threaded perforation in body A and extends into a socket 44 in sleeve $A^2$. A spring 43 is mounted between the head 45 of said bolt and the inner end of said socket and tends to hold body A back against the shoulder in said sleeve. The head 11 is formed with a short recess $r$ in one side of its central opening through which bolt 42 passes the ends of said recess serving as stops to limit the rocking movement of said head.

A cylindrical shell $A^3$ is mounted with its front end under the flange $a'$ of the body A and with its rear end resting on the periphery of the head 11 thus inclosing the chamber surrounding the rear end of the body and cutter-holder trunnions. A transverse screw 17 is mounted to turn in a tangential socket in cylinder $A^3$ and engages with screw-threads in the periphery of the head 11 so that by turning said screw said cylinder will be rotated around said head. The sleeve $A^2$ is intended to be attached to the spindle, or turret, of the machine. On the face of flange $a'$ are formed graduation marks, as shown in Fig. 3 and an indicator mark $o$ is formed on the side of cylinder $A^3$ adjacent thereto by which the exact degree of adjustment may be determined.

The cutter-holders B each comprise a suitable trunnion having a cutter-supporting part $B'$ extending to one side of the axis thereof. Said trunnions are formed as shown in the above mentioned application with the inner side extending rearwardly to bear on the rearwardly extending bearing in the inner face of the body, while its outer end projects forward to bear against the bearing surface of the inner side of each of the projecting arms $a^2$, which project forward to surround the die at the point of work.

The cutters C are mounted in the cutter-holding recess on the face of the cutter-supports $B'$ and are each formed with an interengaging flange and groove near the outer edge of its back and at its inner edge is clamped by means of a cam cylinder $b$ having a slot $b'$ for a screw-driver connection in its front end. Said cam cylinders are each mounted in a bearing in the part $B'$ extending in line with the inner edges of said cutters and cutting into the cutter-holding recesses. The cam surface is made of a gradual pitch so that by forcing it against the edge of said cutter it will hold by frictional contact without additional holding means. When it is desired to remove the cutter by the use of a screw-driver, said cam cylinder is turned back as indicated in Fig. 8, when a notch $n$ therein will come opposite the inner edge of the cutter and allow it to drop out of the cutter-holding recess. The back of each cutter C is formed with transverse recesses with which annular rings $c$ on an adjusting and holding screw $C'$ are adapted to engage, this structure being the same as shown in my former application. The trunnions of each of said cutter-holders are formed hollow and a plunger 20 is mounted therein being formed with tapered faces $f$ and $f'$ on its front end and with a slot $c^2$ for engagement with the screw-driver. Said plungers 20 are each formed with a circumferential groove 21 with which a flange on the inner face of a ring 22 is adapted to engage. The periphery of said ring is formed with spiral teeth, or threads, which are adapted to engage with spiral grooves in the inner surface of cylinder $A^3$. Said ring 22 is mounted to slide on body A, being held from turning thereon by a spline 40 (see Fig. 5) which engages a notch $v$ (see Fig. 13) in the interior face of said ring. Thus the turning of said cylinder $A^3$ by means of the handle 23, or the screw 17, or the turning of head 11, will slide ring 22 and carry with it the cylindrical plungers 20, one of the tapered outer faces of which bears upon a bearing-plate $c^4$ on the outer surface of the adjacent part $B'$ of the cutter-holder and serves to swing said cutter-holders to open and close the die. A coiled spring 25, one end of which is secured in the adjacent arm $A^2$, is engaged at its other end with the outer face of each adjacent cutter-support and holds said several cutter-supports to swing outwardly on their trunnions in contact with the tapered faces of the plungers, as they slide back and forth, so that as said plungers are slid rearwardly the springs will throw said cutter-supports outwardly and open the die.

The oil supply is fed to the cutters through a pipe 30 leading from the oil supply into a circumferential groove 31 in the sleeve $A^2$ near its outer end. The inner wall of said channel consists of a sleeve 32 mounted in a recess in said sleeve to cover the inner part of said groove. A longitudinal channel 3 (see Fig. 5) leads from said groove 31 to a point in line with the main portion of the body A, where it is adapted to communicate with a radially extending channel 34 in said body, which leads to near the outer surface of the main part of said body, where it communicates with a longitudinal channel 35 leading to the face of said body, where a groove is formed which communicates with a perforation in the part $B'$ of the cutter-holders, each of said parts $B'$ being formed with a perforation leading from this opening to a point near its outer end where it discharges through an opening 36 directly onto the point of the cutter and the work.

In operation, the parts being assembled as best shown in Fig. 3, when the work has advanced to the point for which the machine is set and the work-carriage stops, the continuation of the work for a limited distance will serve to draw the body A forward on the sleeve $A^2$ and compressing spring 43, until the latch-pin 14 is disengaged from the perforation 15 in the head 11. Immediately on the disengagement taking place the spring 16 will expand to turn said head 11 carrying with it the cylinder A³ with the internal spiral ribs which engage with the spiral grooves in the periphery of ring 22 thus sliding said ring 22 rearwardly and carrying with it the several plungers 20 and thus permitting the springs 25 to swing the inner ends of the cutter-holders outwardly to open the die and release the die from the work. When it is desired to re-set the die the operator turns cylinder A³ by means of the handle 23 until latch-pin 14 registers with perforation 15 when spring 43 will expand and slide together, pin 14 locking them in closed position. The turning of cylinder A³ serves to carry ring 22 and the plungers 20 forward to return the cutter-holders to their closed positions. The extensions, or arms, $a^2$ are formed on their inner surfaces as extensions of the bearings for the outer sides of the cutter-holder trunnions and being connected by the rigid ring A' which is formed with a shoulder which fits over a shoulder, or projection, on the outer ends of said arms affords a rigid support to the outer ends of said arms and a rigid bearing against the strain of the work, the die being located within the structure thus formed. The inner edge of said ring overlapping the ends of the trunnions holds said trunnions securely in place. The oil supply flows through the channel before described, its supply being automatically cut off when the die is open by the sliding forward of the body A on the sleeve A² so that the opening from channel 33 into channel 34 is covered by said body when the parts are in open position. The outer end of the channel 35 is of sufficient size to communicate with the entrance to the channel formed in part B' of the cutter-holder throughout the limited movement of said cutter-holder on its trunnion in adjustments for different sizes of work. Said adjustments are effected by turning the screw 17, as in my above mentioned application, which adjusts the relative position of the cylinder A³ and head 11 and thus adjusts the normal position of the adjusting ring 22.

The cutters C are each secured in its cutter-holder as best shown in Figs. 7 and 8 by means of the cam cylinder $b$ which is formed with a very gradual pitch so that it will impinge upon the inner edge of said cutter and remain in locked position by frictional contact only, without additional securing means. By means of the notch $n$ formed in one side of said cylinder a transversely sliding movement of the cutter is permitted when the cam is turned, as shown in Fig. 8, so that the cutter will fall out of its seat and dis-engage from the tapered flange at the opposite side, thus permitting the ready removal and re-placement of the cutters. The cutters are secured and adjusted longitudinally by the screw C' as in the above mentioned application.

The plungers 20 are formed with two bearing faces of varying distances from the center, instead of three, as shown in my former application. Otherwise the construction and operation of this part is the same as therein shown and described. In this application, as well as in the other, the cutter-holder trunnions are cylindrical only for a short distance at their central portions, the bearing surfaces being extended on their inner ends on one side and on their outer ends on the diagonally opposite side so that while an unusually long bearing is afforded to the trunnion to resist the strain of the work, yet the head itself is made comparatively short by reason of cutting out the inside corners of the trunnions on their front ends and the outside corners on their rear ends, forming chambers within the length of the bearings themselves for the location of the adjusting and securing devices. By this arrangement the structure may be made compact and its length materially reduced from that of similar structures in ordinary use without in any way impairing its rigidity, or efficiency. This will be readily seen from an inspection of the drawings which are the actual size of the tool for practical use.

Having thus fully described my said invention, what I claim as new and desire to secure by Letters Patent, is:

1. A cutter-head for cutting screws, etc., comprising a body formed with bearings for the cutter-holder trunnions, a sleeve for attachment to the machine on which said body is mounted by a sliding engagement, cutter-holders with their trunnions mounted in said bearings, sliding plungers with tapered faces mounted in perforations in said trunnions with their outer ends adapted to bear against the outer face of the adjacent cutter-holder for securing and adjusting the same, an adjusting ring engaging with the rear ends of said plungers, a cylinder with internal spiral ribs or threads engaging with spiral grooves in the periphery of said ring, means for securing said cylinder when the die is closed, and means for turning said cylinder independent of the body when the die is opened, substantially as set forth.

2. A cutter-head comprising a sleeve or cylinder for securing the cutter-head to the spindle or turret of the machine, a body mounted on the outer end of said sleeve by means of a sliding connection and formed with bearings for the trunnions of the cutter-holders, a head secured to the rear end of the body to turn independent thereof, a cylinder secured on said head by means of an adjusting screw whereby it is held to turn therewith or may be adjusted circumferentially thereon, means for securing said head to said cylinder when the parts are in closed position, means for turning said head when the parts are unlocked, the cutter-holders with their trunnions mounted on the bearings in the body provided therefor, said trunnions being formed with central perforations, sliding plungers with tapered faces on their outer ends mounted in said perforations, said tapered faces being arranged to bear upon the backs of the adjacent cutter-holders for securing and adjusting them, a ring formed to engage the inner ends of said plungers, the outer surface of said ring being formed with spiral grooves and the inner surface of the surrounding cylinder being formed with internal spiral ribs adapted to engage therewith, and means for turning said cylinder to return the parts from open to closed position, substantially as set forth.

3. A cutter-head comprising a sleeve for securing the head to the spindle or turret of the machine, said sleeve being formed with a shoulder a distance from its rear end, a body mounted on said sleeve and formed with bearings for the cutter-holder trunnions, a head secured in the rear end of said body to have an independent rotary movement, a latch-pin for engaging a perforation in said head, means for normally holding said body back with said head against the shoulder in said sleeve, means for rocking said head on said body when the latch-pin is disengaged, cutter-holders mounted with their trunnions in said bearings, and means for adjusting and holding said cutter-holders to open and close the die connected with said head and operated thereby, substantially as set forth.

4. A cutter-head comprising a sleeve for securing the head to the spindle or turret of the machine, a body mounted to have a limited longitudinal movement on said sleeve, means for normally holding said body against a fixed shoulder in said sleeve, a locking device between said parts adapted to be engaged and disengaged by the movement of said body, cutter-holders with their trunnions mounted in bearings formed in said body, and means for securing and adjusting said cutter-holders, substantially as set forth.

5. A cutter-head comprising a body formed with bearings around its axis for the trunnions of the cutter-holders, said bearings being formed with extensions on the front end of the body on the outside and on the inner end of the body on the inside, the outer ends of said outer extensions being secured together by a rigid ring, cutter-holders formed with trunnions having outward extensions of their bearing surfaces on their outside forward corners and inwardly extending bearing surfaces on their inside rear corners, and means for securing and adjusting said cutter-holders, substantially as set forth.

6. A cutter-head comprising a body formed with outwardly extending arms the inner faces of which are extensions of the bearings for the cutter-holder trunnions, a solid ring connecting the outer ends of said several arms, the cutter-holders with their trunnions mounted in said bearings, and means for supporting and adjusting said cutter-holders mounted between the bearing of one cutter-holder and the back of the adjacent cutter-holder, substantially as set forth.

7. A cutter-head comprising a body formed with bearings for the cutter-holders arranged around its axis, said cutter-holders, forwardly extending arms in line with said bearings the inner surfaces of said arms being adapted to serve as extensions to said several bearings, and a solid ring connecting the outer ends of said several arms, substantially as set forth.

8. A cutter-head comprising a body formed with bearings around its axis for the trunnions of the cutter-holders, forwardly extended parts arranged to serve as extensions of the outer sides of said bearings, a solid ring connecting the outer ends of said extensions, cutter-holders mounted with their trunnions in said bearings, the cutter-holders being arranged within the space surrounded by said arms, springs mounted within said space for normally holding said cutter-holders open, and means for adjusting and securing said cutter-holders to open and close the die, substantially as set forth.

9. A cutter-head comprising a body mounted to have a limited longitudinal movement, a sleeve supporting said body, a head inter-locked with the rear end of said body, means for locking said head to said sleeve, cutter-holders mounted with their trunnions in bearings in said body, means for securing and adjusting said cutter-holders, said means being connected to and operated by said head, substantially as set forth.

10. A cutter-head comprising a sleeve, a body mounted to have a limited longitudinal movement on said sleeve, cutter-holders on said body, said parts having an oil supply channel connected with an oil supply pipe and extending longitudinally through said sleeve to a point adjacent to said body and then radially to communicate with the radial channel in said body and then longitudinally to the outer face of said body where it communicates with a channel in the cutter-supporting part of the cutter-holder and extends to discharge at the point of cutting, substantially as set forth.

11. A cutter-head comprising a body, cutter-holders mounted on trunnions journaled on bearings in said body, means for securing and adjusting said cutter-holders, cutters mounted in said cutter-holders, said cutters being secured in said cutter-holders by means of inter-engaging tapered flanges near the outer rear corner of said cutters, and a cam cylinder adapted to engage with the inner edge of each of said cutters, said cam cylinders being each formed to engage with a tool for turning the same and with a recess in one side to release the cutter from said engaging flanges, substantially as set forth.

12. A cutter-head comprising a sleeve, a body mounted to have a limited longitudinal movement on said sleeve, cutter-holders on said body, said parts being formed with a continuous communicating oil channel running from an oil supply to point of cutting, and means for sliding said body on said head to open the die and automatically cut off said oil channel, substantially as set forth.

In witness whereof, I, have hereunto set my hand and seal at Washington, District of Columbia this 7th day of April, A. D. nineteen hundred and ten.

ABRAHAM B. LANDIS. [L. S.]

Witnesses:
E. W. BRADFORD,
J. D. YOAKLEY.